Figure 1:
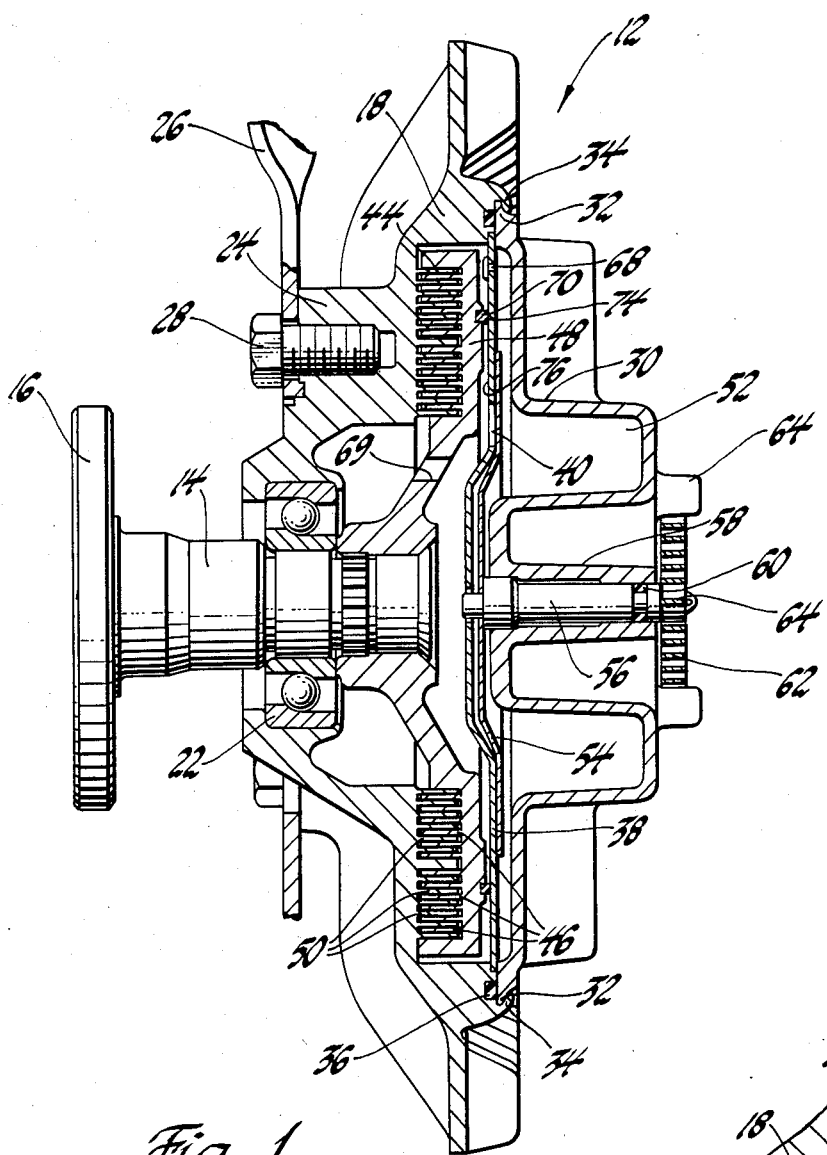

United States Patent [19]

Johnston et al.

[11] Patent Number: 4,630,721
[45] Date of Patent: Dec. 23, 1986

[54] VISCOUS CLUTCH FOR ENGINE COOLING FAN

[75] Inventors: Gary L. Johnston, Pleasant Hill; Harvey J. Lambert, West Milton, both of Ohio

[73] Assignee: General Motors Corporation, Detroit, Mich.

[21] Appl. No.: 657,974

[22] Filed: Oct. 5, 1984

[51] Int. Cl.⁴ .............................. F16D 31/00
[52] U.S. Cl. .................. 192/58 B; 192/82 T
[58] Field of Search ............. 192/82 T, 58 B

[56] References Cited

U.S. PATENT DOCUMENTS

| | | | |
|---|---|---|---|
| 3,552,532 | 1/1971 | Thomas et al. | 192/82 T X |
| 3,949,849 | 4/1976 | Hammer | 192/58 B |
| 4,103,765 | 8/1978 | Tinholt | 192/82 T |
| 4,116,318 | 9/1978 | Crisenbery et al. | 192/82 T X |
| 4,181,205 | 1/1980 | Mennucci et al. | 192/82 T X |
| 4,271,946 | 6/1981 | Bridge | 192/82 T X |
| 4,310,085 | 1/1982 | Laflame | 192/82 T X |

*Primary Examiner*—George H. Krizmanich
*Attorney, Agent, or Firm*—Charles R. White

[57] ABSTRACT

A viscous fan clutch which employs a dynamic blocker ring positioned inside of the clutch between the pump plate and the clutch plate in such a manner that the fluid flow path is directed and not left to chance. The blocker ring, in effect, hydraulically separates the drive portion of the clutch from the pump and viscous fluid storage portion. The divider ring due to its location will provide support outboard of the bearing providing optimized durability.

4 Claims, 2 Drawing Figures

VISCOUS CLUTCH FOR ENGINE COOLING FAN

This invention relates to fan clutches and more particularly to an automatic viscous clutch for an engine cooling fan featuring new and improved routing of the viscous fluid in the clutch for optimized fluid clutch performance and for improved pump-out performance to reduce clutch disengagement time.

An automatic viscous fan clutch is a hydraulic device used to vary fan speed in response to engine temperature variation. This device permits the use of a high delivery fan to insure adequate cooling at reduced engine speeds while eliminating excessive noise and power loss at high speeds when cooling capacity is not needed. When the engine is cool, the viscous clutching fluid, preferably a silicone fluid, is stored in a reservoir chamber of the fan clutch and is blocked from entry into the working area of the clutch. As the temperature of the engine rises, so does the temperature of a bimetallic coil which is connected to a control arm that moves a valve plate exposing an opening in the pump plate. The silicone fluid flows through this opening from the reservoir into the working area in the clutch. Pumping devices located on the pump plate force the fluid back into the reservoir through small openings in front of each of the pumps. As the temperature continues to rise, the arm uncovers more of the opening and allows more of the silicone fluid to enter the working chamber. The automatic fan clutch becomes fully engaged when the silicone fluid circulating between the working chamber and the reservoir reaches a sufficient level in the working chamber to completely fill the fluid shear zone formed between the clutch body and the clutch plate. The resistance of the silicone fluid to the shearing action caused by the speed differential between the body and plate transmits torque to the clutch body to thereby turn the fan blade assembly attached thereto. The reverse situation occurs when the temperature drops on such occurrence, the bimetallic controlled valve plate slowly closes off the opening thus blocking the fluid flow from the reservoir into the working chamber. The action of the pump members removes the silicone fluid from the shear zone or the working chamber and reduces the shearing action. Thus less torque is transmitted to the clutch body and the speed of the fan decreases.

This invention applies to a viscous fan clutch such as described above and provides improved pump-out performance of the clutch to reduce and optimize disengagement time and to reduce the temperature differential between the engagement and disengagement temperature. The preferred embodiment of this invention employs a divider ring positioned inside of the fan clutch between the pump plate and the clutch plate in an optimized position so that the fluid flow path is directed and not left to chance. The divider ring of this invention, in effect, hydraulically separates the drive portion of the clutch from the pump and storage portion. The use of the divider ring of this invention improves engagement performance by forcing the fluid entering from the reservoir to flow directly into the fluid shear zone formed between the concentric lands or drive grooves of the clutch plate and body for more efficient hydraulic clutching operation. The divider ring also provides a positively defined pump-out cavity and thereby insures a positive rapid disengagement. This invention effectively reduces the temperature differential between engagement and disengagement temperatures so that the fan is driven only when engine cooling is required. The divider ring due to its location will provide support outboard of the viscous clutch bearing providing a positive influence on durability.

These and other features, objects and advantages of this invention will become more apparent from the following detailed description and drawing in which:

FIG. 1 is a cross-sectional view of a portion of a fluid clutch and fan assembly.

Figure 2:
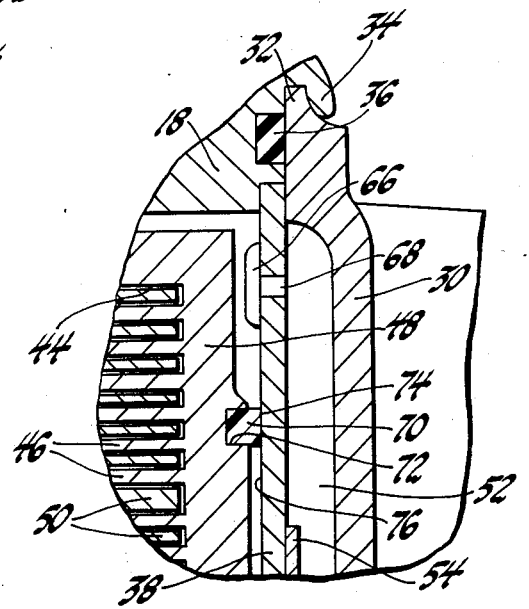

FIG. 2 an enlarged portion of the fan clutch assembly of FIG. 1.

Turning now in greater detail to the drawing, there is shown in FIG. 1 a multi-bladed fan and clutch assembly 12 for drawing cooling air through the core of a vehicle radiator, not shown, through which engine cooling fluid is circulated. The fan and clutch assembly 12 is mounted on the outboard end of a rotatably driven shaft 14 whose inner end terminates in a flange 16 which can be secured to a conventional engine-driven water pump pulley, not shown. The fan and clutch assembly 12 comprises an annular dish-like main clutch body 18 centrally mounted for rotation on shaft 14 by bearing 22. The main body 18 is formed with a plurality of radially extending bosses 24 to which a multi-bladed fan 26 is attached by threaded fasteners 28. A cover plate 30 is mounted to the adjacent shear face of the front of the main body 18 and cooperates therewith to form a housing for the viscous clutch and reservoir of this invention.

The cover plate 30 is a dished member whose annular outer edge 32 is secured to the main body by annular retainer lip 34 spun over from the material of the main body. Annular seal 36 interposed between the edge 32 and the forward face of the main body prevents fluid leakage of the silicone viscous clutching fluid from the interior of the clutch.

Disposed immediately behind cover plate 30 is a disk-like annular pump plate 38 whose diameter is slightly less than that of the cover plate 30. This pump plate is drivingly secured to the main body 18 since it is trapped between an annular shoulder on the main body by the cover plate 30 as best illustrated in FIG. 2.

The pump plate has an opening or gate 40 therein which, when opened, directs a flow of the silicone clutching fluid into an annular serpentined fluid shear zone 44 formed by the space between the interleaved concentric annular ridges 46 of a rear or inner face of a clutch plate 48 and corresponding concentric annular ridges 50 formed on the interior surface of the main body 18. The fluid sheared in this shear zone 44 transmits input torque from the rotatably driven clutch plate 48, centrally splined to shaft 14, to provide for the hydraulic drive of main body 18 and the bladed fan 26 attached thereto for cooling fan operation. A reservoir 52 formed between the cover plate 30 and the pump plate 38 contains a specified quantity of silicone clutching fluid that circulates in a generally toroidal path when the gate 40 is open to varying degrees of opening as described. The opening and closing of the gate 40 to control the supply of the clutch silicone fluid into the shear zone is through a valve plate 54 that extends from driving connection with the center shaft 56 which is rotatably mounted in a tubular hub portion 58 formed in the center of the cover plate 30. An O-ring seal 60 is mounted in an annular groove in the shaft 56 and makes peripheral contact with the inner wall of the hub to prevent fluid leakage to the exterior of the unit. A helically wound bimetallic thermostatic valve control element 62 is provided with an inner end portion 64 which is mounted in a transverse slot formed in the forward end of the center shaft 56. The outer end of the valve control element 62 is secured to a post 64 projecting from the cover. With this arrangement, an increase or decrease in ambient temperature causes the winding or unwinding of the metallic element resulting in rotation of the center shaft 56 and the valve plate 54 attached thereto.

A cylindrical projecting pump element 66 pressed in the pump plate 38 adjacent to the periphery thereof pumps fluid through a discharge orifice 68 formed in the pump plate back into the reservoir as is well known in this art. In this invention, there is a new and improved fan clutch divider ring 70 operatively interposed between the pump plate and the clutch plate. This ring is a filled Teflon ring member which is secured in an annular groove 72 formed in the outer face of the clutch plate. The ring 70 is of a square cross-section as best shown in FIG. 2 and the outer surface 74 of this ring slidably engages the inner surface 76 of the pump plate 38 to block the passage of fluid from the reservoir past the forward face of the pump plate into the pumping discharge port 68. Accordingly, with this invention, the viscous clutching fluid is blocked from flow between the clutch plate and the pumping plate and is forced to move from gate 40 in the pump plate 38 through passages 69 in the clutch plate to the viscous shear zone 44. In the absence of the dynamic fluid seal and blocker ring 70, much of the viscous fluid leaving the reservoir through gate 40 would flow directly outwardly between the forward face of the clutch plate 48 and the adjacent face of the pump plate into the discharge port 68 thereby bypassing the fluid shear zone 44. This reduces efficiency and effectiveness of the viscous clutch. The annular divider ring provides optimized pump-out performance or clutch disengagement time since the area between the pump plate and clutch plate is blocked and the possibility of oil recirculation downwardly in front of the clutch plate is eliminated when the gate is closed. The divider ring of this invention forces viscous flow into the lands and grooves providing the drive surfaces of this invention. With high speed differential, there is high efficiency and high volume pumping. The clutch blocker ring 70 further provides improved support outboard of the bearing providing a positive influence on durability. With this ring providing an outboard bearing, the clutch plate cannot frictionally contact the inside of the cover plate. This reduces heat buildup and wear and thereby extends service life.

While a preferred embodiment of this invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A bladed fan and viscous clutch assembly for inducing a flow of air comprising an input shaft member adapted to be rotatably driven, clutch plate means rotatably driven by said shaft member, said clutch plate means having a rear face for shearing viscous fluid and having a front face, clutch body means housing said clutch plate means and having an inner viscous shear face axially spaced from said rear face of said clutch plate means to form a viscous fluid shear zone therebetween for receiving a shearable viscous clutch fluid so that said clutch body means can be driven by said clutch plate means through the shear of said fluid in said zone, fan blade means extending from said clutch body means, a cover plate attached to said clutch body means, a pump plate secured to said clutch body means and cooperating with said cover plate to form a reservoir for a quantity of fluid stored therein, said pump plate having pumping means associated therewith to pump fluid exiting from said shear space back to said reservoir, said reservoir being hydraulically separated from said clutch plate means by said pump plate, valve means associated with said pump plate to control the flow of fluid between said reservoir and said shear space, control means for operating said valve means, and fluid sealing ring means sealingly mounted between the interfacing surfaces of said pump plate and said front face of said clutch plate means to establish a discrete pump out cavity and to hydraulically block the interface between said pump plate and said clutch plate means so that substantially all the fluid exiting from said reservoir will be forced to flow through said shear zone and then to said pump out cavity for subsequent discharge by said pumping means on said pumping plate to said reservoir.

2. A bladed fan and viscous clutch assembly for inducing a flow of air comprising an input shaft member adapted to be rotatably driven, clutch plate means rotatably driven by said shaft member, said clutch plate means having a rear viscous fluid shear face and having a front face clutch body means rotatably mounted on said input shaft and housing said clutch plate means, said clutch body means having an inner viscous fluid shear face axially spaced from said rear viscous fluid shear face of said clutch plate means to form a viscous fluid shear zone therebetween for receiving a shearable viscous clutch fluid so that said clutch body means can be driven by said clutch plate means through the shear of said fluid in said zone, fan blade means extending radially from said clutch body means, a cover plate attached to said clutch body means, a pump plate secured to said clutch body means for rotation therewith and cooperating therewith to form a reservoir for a quantity of fluid stored therein, said pump plate having pumping means associated therewith to pump fluid exiting from said shear zone back to said reservoir, said reservoir being hydraulically separated from said clutch plate means by said pump plate, valve means to control the flow of fluid between said reservoir and said shear zone, control means for operating said valve means, and fluid sealing ring means physically contacting and sealingly mounted between the interfacing surfaces of said pump plate and said clutch plate means to thereby establish a discrete pumping zone and to block the flow path between said pump plate and said clutch plate means to said pumping zone so that the viscous fluid discharged from said reservoir will be forced to flow through said shear zone and then into said pumping zone for subsequent to pumping by said pumping means to said reservoir.

3. A bladed fan and viscous clutch assembly for inducing a flow of cooling air through a radiator in which engine cooling is circulated comprising an input shaft member adapted to be rotatably driven, a clutch plate having a rear viscous fluid shear face and having a front face, said clutch plate being rotatably driven by said shaft member, clutch body means rotatably mounted on said input shaft and housing said clutch plate, said clutch body means having an inner viscous fluid shear face axially spaced from rear face of said clutch plate to form a viscous fluid shear zone therebetween for receiving a shearable viscous clutch fluid so that said clutch body means can be driven by said clutch plate means through the shear of said fluid in said zone, fan blade means extending radially from said clutch body means, a cover plate attached to said clutch body means, a pump plate secured to said clutch body means for rotation therewith and cooperating therewith to form a reservoir for a quantity of viscous clutch fluid stored therein, a pump plate having pumping means near the outer limits thereof to pump fluid exiting from said shear space back to said reservoir, said reservoir being hydraulically separated from said clutch plate by said pump plate, valve means to control the flow of fluid between said reservoir and said shear space, control means for operating said valve means, and slidable fluid sealing ring means carried by one of said plates and slidably contacting the other of said plates to provide a dynamic fluid seal therebetween, said ring being located radially inwardly of said pumping means to establish a discrete pumping zone and to positively block the flow path between said pump and said clutch plate to said pumping zone so that substantially all of the fluid from said reservoir will to flow through said shearing zone into said pumping zone for subsequent pumping by said pumping means to said reservoir.

4. The bladed fan and clutch assembly of claim 3 and including bearing means operatively interposed between said clutch body means and said input shaft member and said slidable fluid sealing ring means spaces said clutch plate from said pump plate to eliminate frictional contact therebetween to increase service life of said assembly.

* * * * *